(12) United States Patent
Wu et al.

(10) Patent No.: US 12,013,482 B2
(45) Date of Patent: Jun. 18, 2024

(54) DEVICE AND METHOD FOR DETECTION (71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 176 days.

(21) Appl. No.: 17/708,529

(22) Filed: Mar. 30, 2022

(65) Prior Publication Data
US 2023/0026083 A1 Jan. 26, 2023

Related U.S. Application Data

(60) Provisional application No. 63/223,553, filed on Jul. 20, 2021.

(51) Int. Cl.
*H01Q 21/28* (2006.01)
*G01S 7/03* (2006.01)
*G01S 13/34* (2006.01)
*H01P 3/16* (2006.01)

(52) U.S. Cl.
CPC ............. *G01S 7/032* (2013.01); *G01S 13/34* (2013.01); *H01P 3/16* (2013.01)

(58) Field of Classification Search
CPC ............. G01S 7/032; G01S 13/34; H01P 3/16
USPC ........................................................ 343/759
See application file for complete search history.

(56) References Cited

U.S. PATENT DOCUMENTS

| | | | | |
|---|---|---|---|---|
| 2006/0087385 | A1* | 4/2006 | Fitzpatrick | G01S 13/0209 333/117 |
| 2016/0195676 | A1* | 7/2016 | Yu | G02B 6/107 385/11 |
| 2019/0044242 | A1* | 2/2019 | Wu | H01Q 21/28 |
| 2021/0271099 | A1* | 9/2021 | Kukutsu | H04B 10/90 |

FOREIGN PATENT DOCUMENTS

| | | |
|---|---|---|
| CN | 102868026 A | 1/2013 |
| CN | 105190991 A | 12/2015 |
| CN | 106471753 A | 3/2017 |
| TW | 201636667 A | 10/2016 |
| TW | 201712950 A | 4/2017 |
| TW | 201725384 A | 7/2017 |
| TW | 202013819 A | 4/2020 |
| TW | 202125038 A | 7/2021 |

* cited by examiner

*Primary Examiner* — Peguy Jean Pierre
(74) *Attorney, Agent, or Firm* — Birch, Stewart, Kolasch & Birch, LLP (57) ABSTRACT

A detection device for detecting an object under test includes a radar module, a waveguide element, and a first antenna element. The waveguide element is coupled to the radar module. The first antenna element is disposed on the waveguide element. The radar module generates a first electromagnetic incident wave. The first antenna element transmits the first electromagnetic incident wave toward the object. The first antenna element receives a first electromagnetic reflection wave from the object. The radar module processes the first electromagnetic reflection wave. The first electromagnetic incident wave and the first electromagnetic reflection wave are propagated through the waveguide element.

23 Claims, 7 Drawing Sheets

DEVICE AND METHOD FOR DETECTION

CROSS REFERENCE TO RELATED APPLICATIONS

This application claims the benefit of U.S. Provisional Application No. 63/223,553, filed on Jul. 20, 2021, the entirety of which is incorporated by reference herein.

BACKGROUND OF THE INVENTION

Field of the Invention

The invention relates to a detection device, and more particularly, to a detection device and an antenna structure therein.

Description of the Related Art

HMDs (Head Mounted Displays) have been widely used in the fields of VR (Virtual Reality), MR (Mixed Reality), AR (Augmented Reality), etc. In order to improve user experience, an HMD requires an independent circuit to perform the detection function. However, the aforementioned independent circuit tends to become a bottleneck in smaller and lighter HMDs. Accordingly, there is a need to propose a novel solution for solving the problems of the prior art.

BRIEF SUMMARY OF THE INVENTION

In a preferred embodiment, the invention proposes a detection device for detecting an object under test. The detection device includes a radar module, a waveguide element, and a first antenna element. The waveguide element is coupled to the radar module. The first antenna element is disposed on the waveguide element. The radar module generates a first electromagnetic incident wave. The first antenna element transmits the first electromagnetic incident wave toward the object. The first antenna element receives a first electromagnetic reflection wave from the object. The radar module processes the first electromagnetic reflection wave. The first electromagnetic incident wave and the first electromagnetic reflection wave are propagated through the waveguide element.

In some embodiments, the detection device is a HMD (Head Mounted Display).

In some embodiments, the object is a human face.

In some embodiments, the waveguide element is made of an HDPE (High Density Polyethylene) material.

In some embodiments, the waveguide element substantially has a loop shape.

In some embodiments, the first antenna element is a patch antenna.

In some embodiments, the detection device includes 7 antenna elements.

In some embodiments, the detection device further includes a second antenna element. The second antenna element is disposed on the waveguide element. The radar module generates a second electromagnetic incident wave, and the second antenna element transmits the second electromagnetic incident wave toward the object. The second antenna element receives a second electromagnetic reflection wave from the object, and the radar module processes the second electromagnetic reflection wave. The second electromagnetic incident wave and the second electromagnetic reflection wave are propagated through the waveguide element.

In some embodiments, the detection device further includes a light module and a first surface grating structure. The light module is coupled to the waveguide element. The first surface grating structure is disposed on the waveguide element. The light module generates a first incident light wave, and the first surface grating structure transmits the first incident light wave toward the object. The first surface grating structure receives a first reflection light wave from the object, and the light module processes the first reflection light wave. The first incident light wave and the first reflection light wave are propagated through the waveguide element.

In some embodiments, the detection device further includes a second surface grating structure disposed on the waveguide element. The light module generates a second incident light wave, and the second surface grating structure transmits the second incident light wave toward the object. The second surface grating structure receives a second reflection light wave from the object, and the light module processes the second reflection light wave. The second incident light wave and the second reflection light wave are propagated through the waveguide element.

In some embodiments, the detection device further includes a projection module coupled to the waveguide element. The projection module generates a projection light wave. The projection light wave is propagated through the waveguide element.

In another preferred embodiment, the invention proposes a detection method that includes the steps of: providing a radar module, a waveguide element, and a first antenna element, wherein the waveguide element is coupled to the radar module, and the first antenna element is disposed on the waveguide element; generating a first electromagnetic incident wave via the radar module, wherein the first electromagnetic incident wave is propagated through the waveguide element; transmitting the first electromagnetic incident wave toward the object via the first antenna element; receiving a first electromagnetic reflection wave from the object via the first antenna element, wherein the first electromagnetic reflection wave is propagated through the waveguide element; and processing the first electromagnetic reflection wave via the radar module.

In some embodiments, the detection method further includes: providing a second antenna element, wherein the second antenna element is disposed on the waveguide element; generating a second electromagnetic incident wave via the radar module, wherein the second electromagnetic incident wave is propagated through the waveguide element; transmitting the second electromagnetic incident wave toward the object via the second antenna element; receiving a second electromagnetic reflection wave from the object via the second antenna element, wherein the second electromagnetic reflection wave is propagated through the waveguide element; and processing the second electromagnetic reflection wave via the radar module.

In some embodiments, the detection method further includes: providing a light module and a first surface grating structure, wherein the light module is coupled to the waveguide element, and the first surface grating structure is disposed on the waveguide element; generating a first incident light wave via the light module, wherein the first incident light wave is propagated through the waveguide element; transmitting the first incident light wave toward the object via the first surface grating structure; receiving a first reflection light wave from the object via the first surface grating structure, wherein the first reflection light wave is propagated through the waveguide element; and processing the first reflection light wave via the light module.

In some embodiments, the detection method further includes: providing a second surface grating structure, wherein the second surface grating structure is disposed on the waveguide element; generating a second incident light wave via the light module, wherein the second incident light wave is propagated through the waveguide element; transmitting the second incident light wave toward the object via the second surface grating structure; receiving a second reflection light wave from the object via the second surface grating structure, wherein the second reflection light wave is propagated through the waveguide element; and processing the second reflection light wave via the light module.

In some embodiments, the detection method further includes: providing a projection module, wherein the projection module is coupled to the waveguide element; and generating a projection light wave via the projection module, wherein the projection light wave is propagated through the waveguide element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
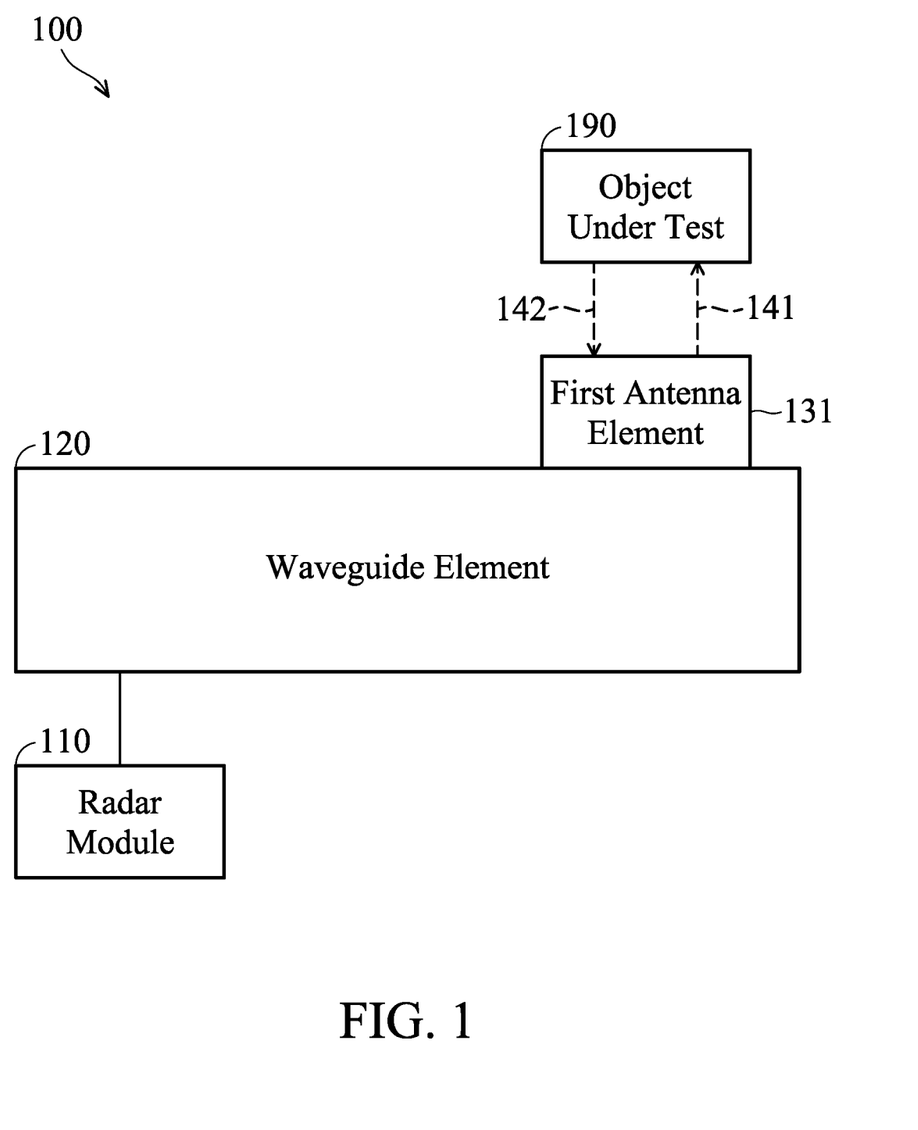
FIG. 1 is a diagram of a detection device according to an embodiment of the invention.

FIG. 1 is a diagram of a detection device 100 according to an embodiment of the invention. For example, the detection device 100 may be applied to an HMD (Head Mounted Display) or a mobile device, such as a smart phone, a tablet computer, or a notebook computer. In the embodiment of FIG. 1, the detection device 100 includes a radar module 110, a waveguide element 120, and a first antenna element 131. It should be understood that the detection device 100 may further include other components, such as a processor and/or a power supply module, although they are not displayed in FIG. 1.

The detection device 100 is configured to detect an adjacent object 190 under test. For example, the object 190 may be a human face, but it is not limited thereto. In alternative embodiments, the object 190 is any conductor or any human portion. It should be noted that the object 190 is not any portion of the detection device 100.

For example, the radar module 110 may include a transmission antenna, a reception antenna, and a signal processing unit (not shown). The waveguide element 120 is coupled to the radar module 110. The waveguide element 120 has a relatively high dielectric constant, which may be greater than or equal to 2. In some embodiments, the waveguide element 120 is made of an HDPE (High Density Polyethylene) material.

The first antenna element 131 is disposed on the waveguide element 120. In some embodiments, the first antenna element 131 is a patch antenna, a monopole antenna, a dipole antenna, a loop antenna, a PIFA (Planar Inverted F Antenna), or a chip antenna, but it is not limited thereto.

Generally, the radar module 110 generates a first electromagnetic incident wave 141, and the first antenna element 131 transmits the first electromagnetic incident wave 141 toward the object 190. Next, the first antenna element 131 receives a first electromagnetic reflection wave 142 from the object 190. Finally, the radar module 110 processes the first electromagnetic reflection wave 142. It should be noted that the first electromagnetic incident wave 141 and the first electromagnetic reflection wave 142 are propagated through the waveguide element 120. Since the waveguide element 120 is configured to limit the propagation directions of the first electromagnetic incident wave 141 and the first electromagnetic reflection wave 142, with such a design, the radar module 110 can easily obtain the relative information of the object 190 by analyzing the first electromagnetic reflection wave 142. Furthermore, because the radar module 110 need not use an additional detection circuit, such a design can attain the goal of lightweight and reducing the manufacturing cost.

The following embodiments will introduce different configurations and detail structural features of the detection device 100. It should be understood that these figures and descriptions are merely exemplary, rather than limitations of the invention.

Figure 2:
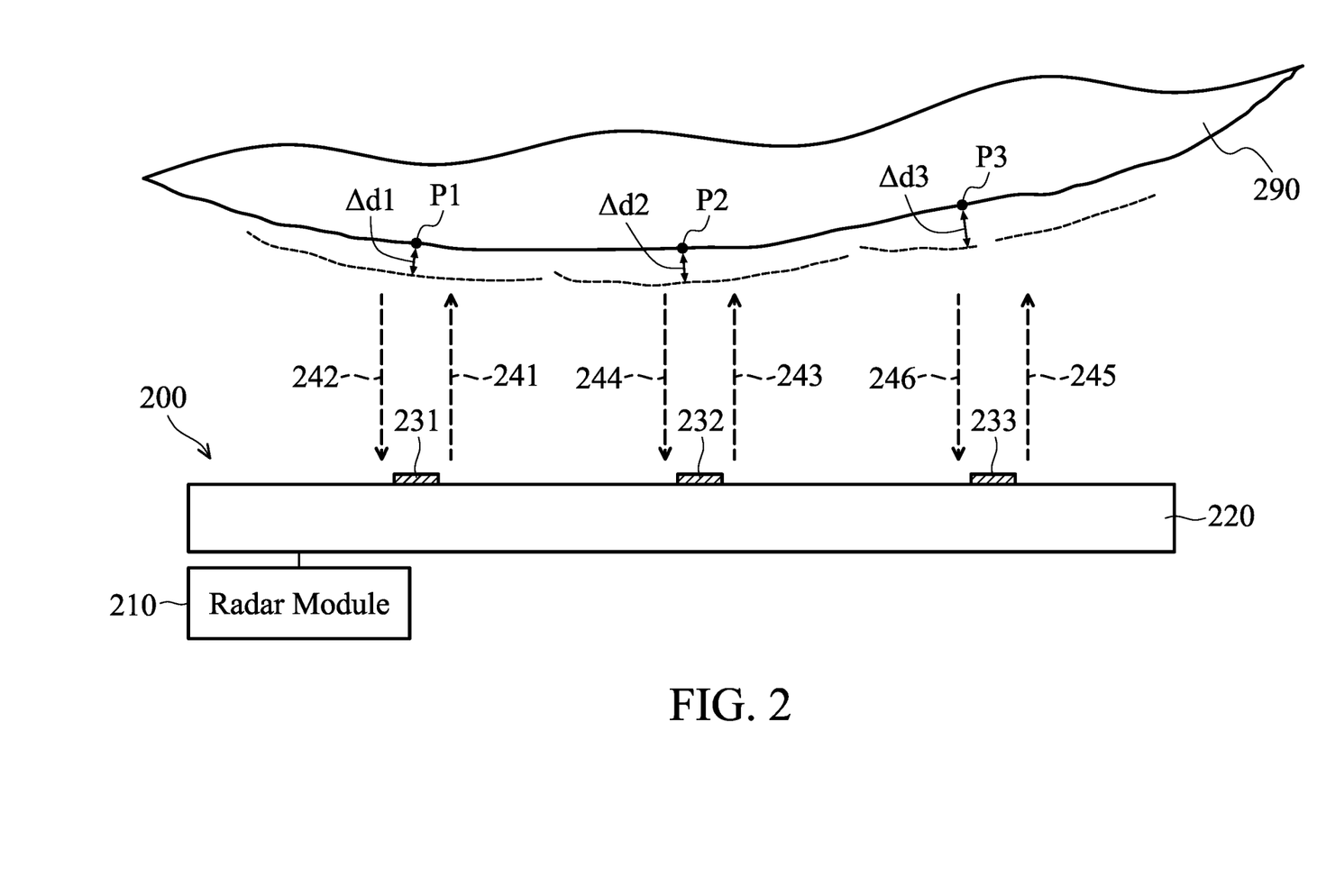
FIG. 2 is a diagram of a detection device according to an embodiment of the invention.

FIG. 2 is a diagram of a detection device 200 according to an embodiment of the invention. FIG. 2 is similar to FIG. 1. In the embodiment of FIG. 2, the detection device 200 includes a radar module 210, a waveguide element 220, a first antenna element 231, a second antenna element 232, and a third antenna element 233. The first antenna element 231, the second antenna element 232, and the third antenna element 233 are disposed on different positions of the waveguide element 220.

The radar module 210 generates a first electromagnetic incident wave 241, a second electromagnetic incident wave 243, and a third electromagnetic incident wave 245. The first antenna element 231 transmits the first electromagnetic incident wave 241 toward a first position P1 of an object 290 under test. In response, the first antenna element 231 receives a first electromagnetic reflection wave 242 from the first position P1 of the object 290. The second antenna element 232 transmits the second electromagnetic incident wave 243 toward a second position P2 of the object 290. In response, the second antenna element 232 receives a second electromagnetic reflection wave 244 from the second position P2 of the object 290. The third antenna element 233 transmits the third electromagnetic incident wave 245 toward a third position P3 of the object 290. In response, the third antenna element 233 receives a third electromagnetic reflection wave 246 from the third position P3 of the object 290. Finally, the radar module 210 processes the first electromagnetic reflection wave 242, the second electromagnetic reflection wave 244, and the third electromagnetic reflection wave 246. It should be noted that the first electromagnetic incident wave 241, the first electromagnetic reflection wave 242, the second electromagnetic incident wave 243, the second electromagnetic reflection wave 244, the third electromagnetic incident wave 245, and the third electromagnetic reflection wave 246 are all propagated through the waveguide element 220 (e.g., using the total internal reflection mechanism of the waveguide element 220).

Specifically, the first electromagnetic reflection wave 242 corresponds to a first displacement $\Delta d1$ at the first position P1 of the object 290, the second electromagnetic reflection wave 244 corresponds to a second displacement $\Delta d2$ at the second position P2 of the object 290, and the third electromagnetic reflection wave 246 corresponds to a third displacement $\Delta d3$ at the third position P3 of the object 290. By analyzing the first electromagnetic reflection wave 242, the second electromagnetic reflection wave 244, and the third electromagnetic reflection wave 246, the radar module 210 can obtain the relative information of the first displacement $\Delta d1$, the second displacement $\Delta d2$, and the third displacement $\Delta d3$ at different positions of the object 290. For example, the aforementioned relative information of the displacements may be obtained by the radar module 210 using the phase change derivation according to the principle of FMCW (Frequency Modulated Continuous Wave). If the object 290 is a human face, the radar module 210 can determine the user's facial expression based on the relative information of the first displacement $\Delta d1$, the second displacement $\Delta d2$, and the third displacement $\Delta d3$. That is, a multi-point detection on the human face can be performed by the single radar module 210 together with the waveguide element 220. In some embodiments, the first electromagnetic incident wave 241, the second electromagnetic incident wave 243, and the third electromagnetic incident wave 245 are generated sequentially one after the other by the radar module 210. The delay time between any two electromagnetic incident waves may be longer than or equal to 3.6 ns. In some embodiments, the aforementioned delay time is exactly 3.6 ns. It should be understood that the delay time is merely exemplary, which is adjustable according to different dielectric constants of the waveguide element 220 between the radar module 210 and the object 290. According to practical measurements, the aforementioned delay time is long enough to prevent the first electromagnetic reflection wave 242, the second electromagnetic reflection wave 244, and the third electromagnetic reflection wave 246 from mixing up with each other. Other features of the detection device 200 of FIG. 2 are similar to those of the detection device 100 of FIG. 1. Therefore, the two embodiments can achieve similar levels of performance.

Figure 3A:
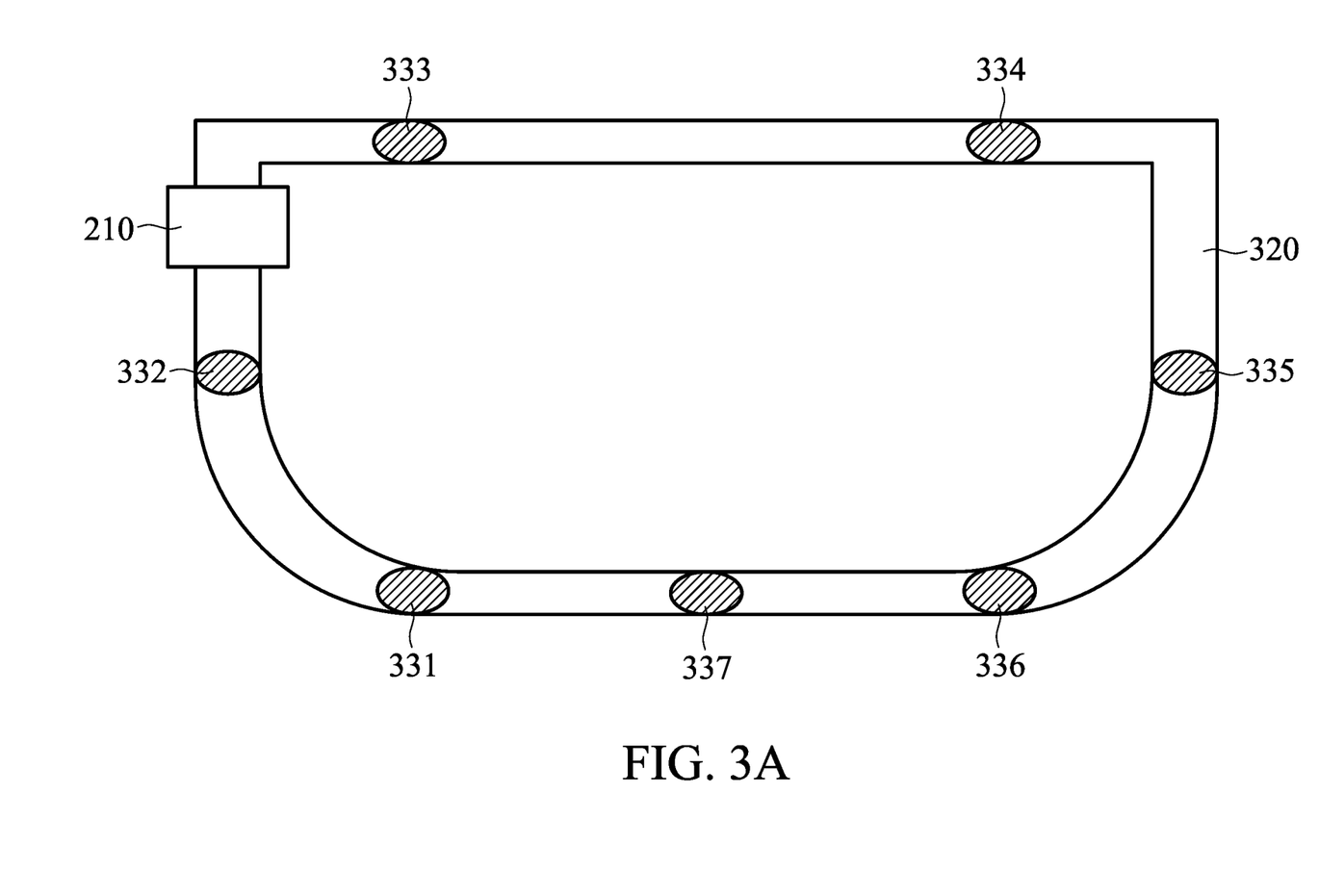
FIG. 3A is a diagram of a waveguide element according to another embodiment of the invention.

FIG. 3A is a diagram of a waveguide element 320 according to another embodiment of the invention. In the embodiment of FIG. 3A, the waveguide element 320 substantially has a loop shape. A first antenna element 331, a second antenna element 332, a third antenna element 333, a fourth antenna element 334, a fifth antenna element 335, a sixth antenna element 336, and a seventh antenna element 337 are disposed on 7 different positions of the waveguide element 320. According to practical measurements, if more antenna elements are used together with the waveguide element 320, the corresponding detection device can obtain more specific detection results. In some embodiments, the first antenna element 331, the second antenna element 332, the third antenna element 333, the fourth antenna element 334, the fifth antenna element 335, the sixth antenna element 336, and the seventh antenna element 337 have different distances to the radar module 210. For example, the aforementioned distances may all be longer than one wavelength ($1\lambda$) of the operational frequency of the first antenna element 331, the second antenna element 332, the third antenna element 333, the fourth antenna element 334, the fifth antenna element 335, the sixth antenna element 336, and the seventh antenna element 337.

Figure 3B:
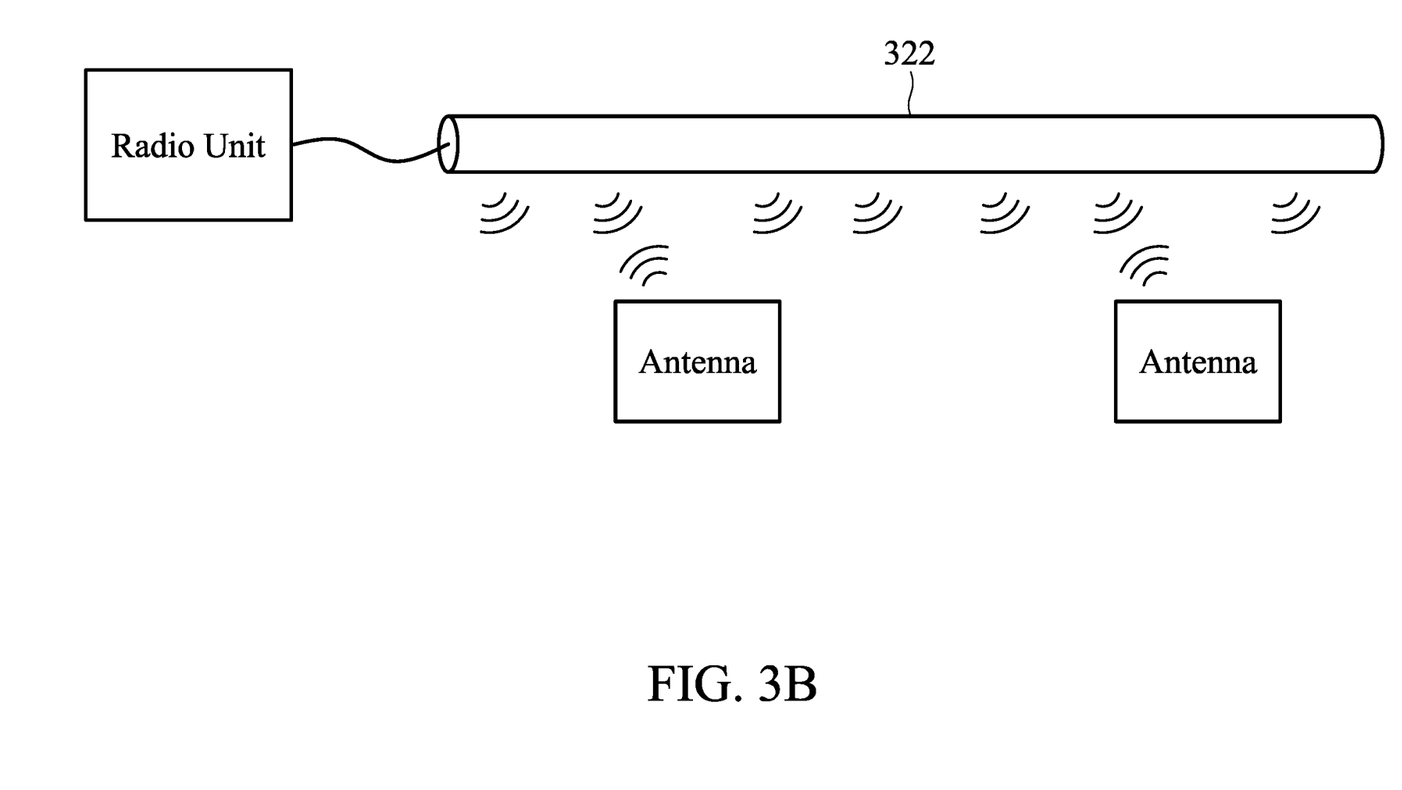
FIG. 3B is a diagram of a waveguide element according to another embodiment of the invention.

FIG. 3B is a diagram of a waveguide element 322 according to another embodiment of the invention. In the embodiment of FIG. 3B, the waveguide element 322 is a metal leaky waveguide, which may simply form a leaky wave radar.

Figure 4:
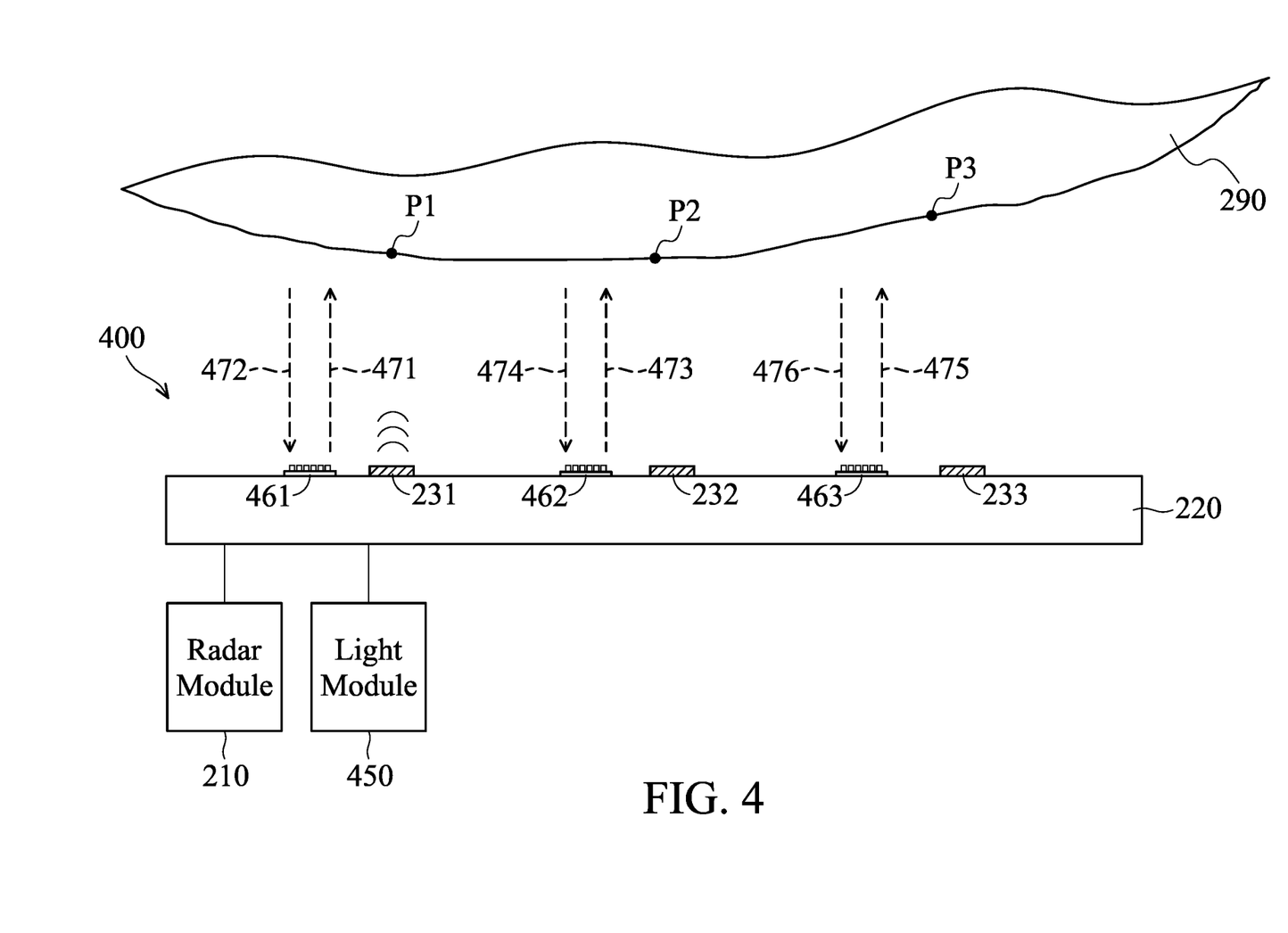
FIG. 4 is a diagram of a detection device according to an embodiment of the invention.

FIG. 4 is a diagram of a detection device 400 according to an embodiment of the invention. FIG. 4 is similar to FIG. 2. In the embodiment of FIG. 4, the detection device 400 further includes a light module 450, a first surface grating structure 461, a second surface grating structure 462, and a third surface grating structure 463. The first surface grating structure 461, the second surface grating structure 462, and the third surface grating structure 463 may be disposed on different positions of the waveguide element 220. For example, the first surface grating structure 461 may be adjacent to the first antenna element 231, the second surface grating structure 462 may be adjacent to the second antenna element 232, and the third surface grating structure 463 may be adjacent to the third antenna element 233, but they are not limited thereto. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance (spacing) between them is reduced to 0).

For example, the light module 450 may include an IRLED (Infrared Light-Emitting Diode), a light sensor, and a light processing unit (not shown). The light module 450 is coupled to the waveguide element 220. The light module 450 generates a first incident light wave 471, a second incident light wave 473, and a third incident light wave 475. The first surface grating structure 461 transmits the first incident light wave 471 toward the first position P1 of the object 290. In response, the first surface grating structure 461 receives a first reflection light wave 472 from the first position P1 of the object 290. The second surface grating structure 462 transmits the second incident light wave 473 toward the second position P2 of the object 290. In response, the second surface grating structure 462 receives a second reflection light wave 474 from the second position P2 of the object 290. The third surface grating structure 463 transmits the third incident light wave 475 toward the third position P3 of the object 290. In response, the third surface grating structure 463 receives a third reflection light wave 476 from the third position P3 of the object 290. Finally, the light module 450 processes the first reflection light wave 472, the second reflection light wave 474, and the third reflection light wave 476. It should be noted that the first incident light wave 471, the first reflection light wave 472, the second incident light wave 473, the second reflection light wave 474, the third incident light wave 475, and the third reflection light wave 476 are all propagated through the waveguide element 220 (e.g., using the total internal reflection mechanism of the waveguide element 220).

Specifically, the first reflection light wave 472 corresponds to first physiological information at the first position P1 of the object 290, the second reflection light wave 474 corresponds to second physiological information at the second position P2 of the object 290, and the third reflection light wave 476 corresponds to third physiological information at the third position P3 of the object 290. By analyzing the first reflection light wave 472, the second reflection light wave 474, and the third reflection light wave 476, the light module 450 can obtain a variety of physiological information at different positions of the object 290. For example, the aforementioned physiological information may include blood oxygen levels, respiratory rates, and/or pulse rates, but it is not limited thereto. In alternative embodiments, the detection device 400 includes more or fewer surface grating structures. With such a design, since the antenna elements and surface grating structures are used together for dual-detections, the detection device 400 can obtain the more detailed information relative to the object 290. Other features of the detection device 400 of FIG. 4 are similar to those of the detection device 200 of FIG. 2. Therefore, the two embodiments can achieve similar levels of performance.

Figure 5:
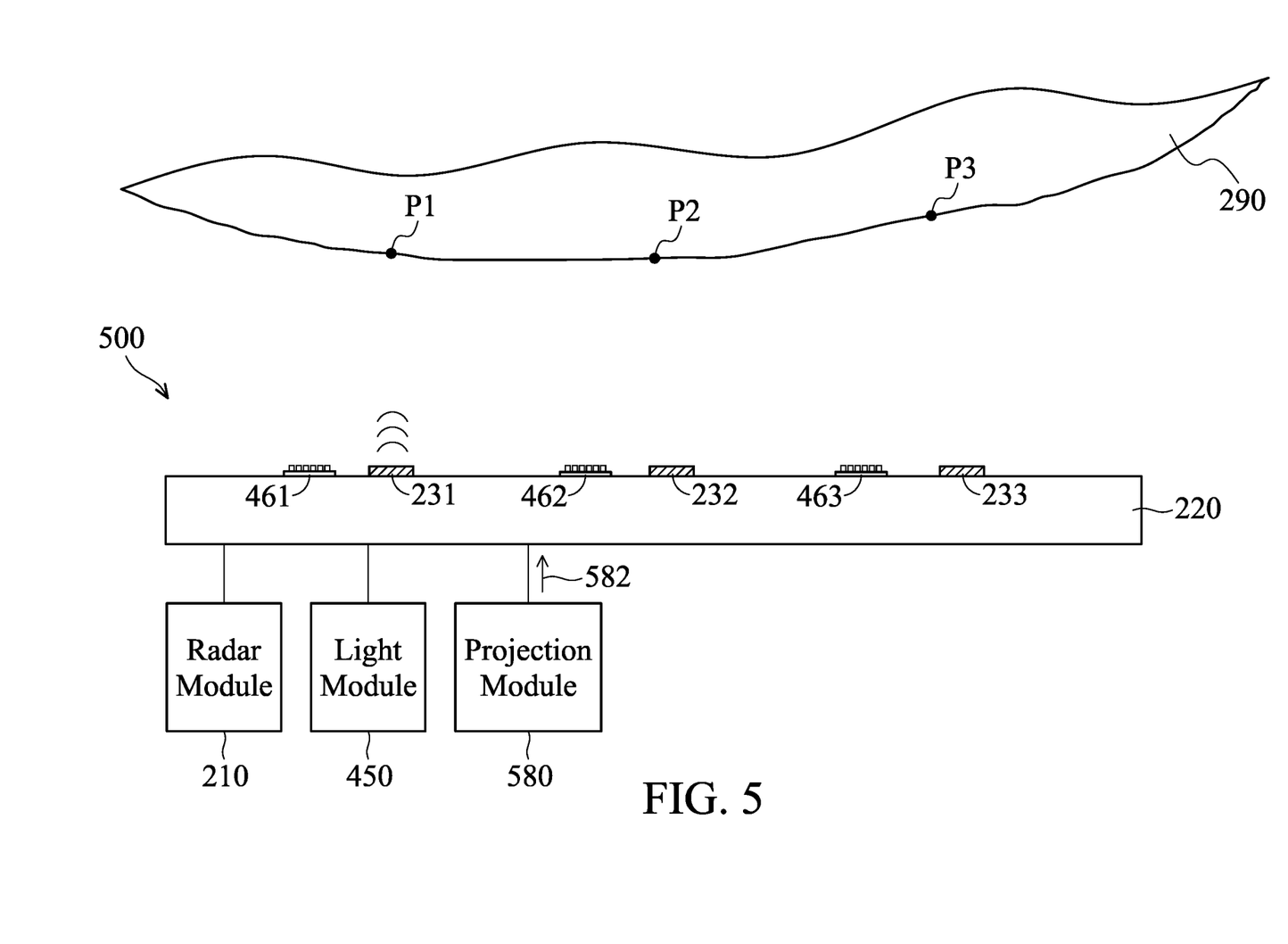
FIG. 5 is a diagram of a detection device according to an embodiment of the invention.

FIG. 5 is a diagram of a detection device 500 according to an embodiment of the invention. FIG. 5 is similar to FIG. 4. In the embodiment of FIG. 5, the detection device 500 further includes a projection module 580. The projection module 580 is coupled to the waveguide element 220, and is configured to generate a projection light wave 582. The projection light wave 582 is propagated through the waveguide element 220. For example, when the detection device 500 is implemented in a HMD, the projection light wave 582 can provide the relative images of VR (Virtual Reality), MR (Mixed Reality) or AR (Augmented Reality) for a user. Other features of the detection device 500 of FIG. 5 are similar to those of the detection device 400 of FIG. 4. Therefore, the two embodiments can achieve similar levels of performance.

Figure 6:
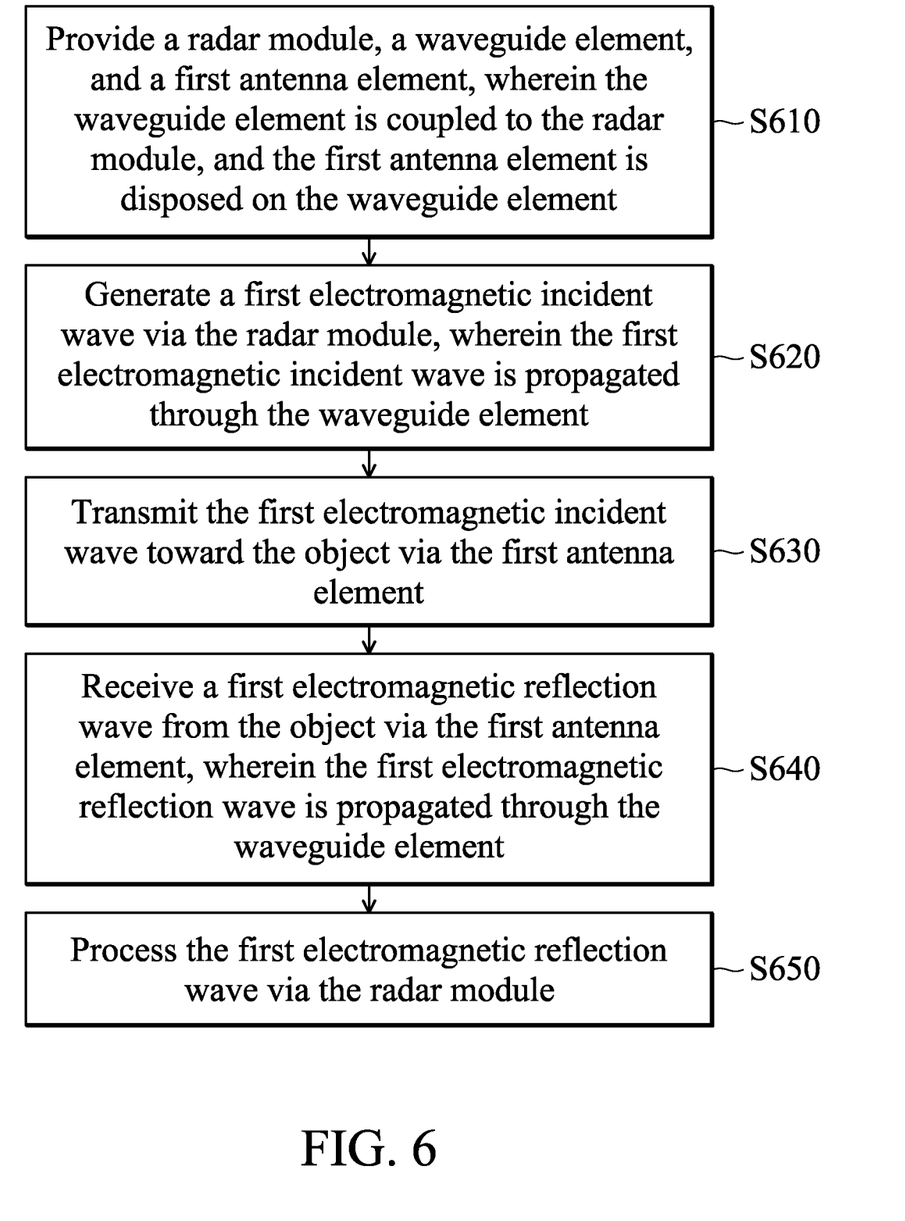
FIG. 6 is a flowchart of a detection method according to an embodiment of the invention.

FIG. 6 is a flowchart of a detection method according to an embodiment of the invention. In the step S610, a radar module, a waveguide element, and a first antenna element are provided. The waveguide element is coupled to the radar module. The first antenna element is disposed on the waveguide element. In the step S620, a first electromagnetic incident wave is generated via the radar module. The first electromagnetic incident wave is propagated through the waveguide element. In the step S630, the first electromagnetic incident wave is transmitted toward the object via the first antenna element. In the step S640, a first electromagnetic reflection wave is received from the object via the first antenna element. The first electromagnetic reflection wave is propagated through the waveguide element. In the step S650, the first electromagnetic reflection wave is processed via the radar module. It should be understood that these steps are not required to be performed in order, and every feature of the embodiments of FIGS. 1 to 5 may be applied to the detection method of FIG. 6.

The invention proposed a novel detection device and a novel detection method. In comparison to the conventional design, the invention has at least the advantages of minimizing the whole size and reducing the whole manufacturing cost. Therefore, the invention is suitable for application in a variety of devices.

Note that the above element parameters are not limitations of the invention. A designer can fine-tune these setting values according to different requirements. It should be understood that the detection device and detection method of the invention are not limited to the configurations of FIGS. 1-6. The invention may include any one or more features of any one or more embodiments of FIGS. 1-6. In other words, not all of the features displayed in the figures should be implemented in the detection device and detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A detection device for detecting an object under test, and comprising:
   a radar module;
   a waveguide element, coupled to the radar module; and
   a first antenna element, disposed on the waveguide element;
   wherein the radar module generates a first electromagnetic incident wave, and the first antenna element transmits the first electromagnetic incident wave toward the object;
   wherein the first antenna element receives a first electromagnetic reflection wave from the object, and the radar module processes the first electromagnetic reflection wave;
   wherein the first electromagnetic incident wave and the first electromagnetic reflection wave are propagated through the waveguide element;
   wherein the detection device further comprises:
   a second antenna element, disposed on the waveguide element;
   wherein the radar module generates a second electromagnetic incident wave, and the second antenna element transmits the second electromagnetic incident wave toward the object;
   wherein the second antenna element receives a second electromagnetic reflection wave from the object, and the radar module processes the second electromagnetic reflection wave.

2. The detection device as claimed in claim 1, wherein the detection device is a HMD (Head Mounted Display).

3. The detection device as claimed in claim 1, wherein the object is a human face.

4. The detection device as claimed in claim 1, wherein the waveguide element is made of an HDPE (High Density Polyethylene) material.

5. The detection device as claimed in claim 1, wherein the waveguide element is a metal leaky waveguide.

6. The detection device as claimed in claim 1, wherein the waveguide element substantially has a loop shape.

7. The detection device as claimed in claim 1, wherein the first antenna element is a patch antenna.

8. The detection device as claimed in claim 1, further comprising a plurality of antenna elements.

9. The detection device as claimed in claim 8, wherein the antenna elements have different distances to the radar module.

10. The detection device as claimed in claim 9, wherein the distances are all longer than one wavelength of an operational frequency of the antenna elements.

11. The detection device as claimed in claim 1,
    wherein the second electromagnetic incident wave and the second electromagnetic reflection wave are propagated through the waveguide element.

12. The detection device as claimed in claim 1, further comprising:
    a light module, coupled to the waveguide element; and
    a first surface grating structure, disposed on the waveguide element;
    wherein the light module generates a first incident light wave, and the first surface grating structure transmits the first incident light wave toward the object;
    wherein the first surface grating structure receives a first reflection light wave from the object, and the light module processes the first reflection light wave;
    wherein the first incident light wave and the first reflection light wave are propagated through the waveguide element.

13. The detection device as claimed in claim 12, further comprising:
    a second surface grating structure, disposed on the waveguide element;
    wherein the light module generates a second incident light wave, and the second surface grating structure transmits the second incident light wave toward the object;
    wherein the second surface grating structure receives a second reflection light wave from the object, and the light module processes the second reflection light wave;
    wherein the second incident light wave and the second reflection light wave are propagated through the waveguide element.

14. The detection device as claimed in claim 1, further comprising:
    a projection module, coupled to the waveguide element, and generating a projection light wave;
    wherein the projection light wave is propagated through the waveguide element.

15. A detection method, comprising the steps of:
    providing a radar module, a waveguide element, and a first antenna element, wherein the waveguide element is coupled to the radar module, and the first antenna element is disposed on the waveguide element;
    generating a first electromagnetic incident wave via the radar module, wherein the first electromagnetic incident wave is propagated through the waveguide element;
    transmitting the first electromagnetic incident wave toward the object via the first antenna element;
    receiving a first electromagnetic reflection wave from the object via the first antenna element, wherein the first electromagnetic reflection wave is propagated through the waveguide element; and
    processing the first electromagnetic reflection wave via the radar module.

16. The detection method as claimed in claim 15, wherein the object is a human face.

17. The detection method as claimed in claim 15, wherein the waveguide element is made of an HDPE material.

18. The detection method as claimed in claim 15, wherein the waveguide element substantially has a loop shape.

19. The detection method as claimed in claim 15, wherein the first antenna element is a patch antenna.

20. The detection method as claimed in claim 15, further comprising:
    providing a second antenna element, wherein the second antenna element is disposed on the waveguide element;
    generating a second electromagnetic incident wave via the radar module, wherein the second electromagnetic incident wave is propagated through the waveguide element;
    transmitting the second electromagnetic incident wave toward the object via the second antenna element;

receiving a second electromagnetic reflection wave from the object via the second antenna element, wherein the second electromagnetic reflection wave is propagated through the waveguide element; and processing the second electromagnetic reflection wave via the radar module.

21. The detection method as claimed in claim 15, further comprising:

providing a light module and a first surface grating structure, wherein the light module is coupled to the waveguide element, and the first surface grating structure is disposed on the waveguide element;

generating a first incident light wave via the light module, wherein the first incident light wave is propagated through the waveguide element;

transmitting the first incident light wave toward the object via the first surface grating structure;

receiving a first reflection light wave from the object via the first surface grating structure, wherein the first reflection light wave is propagated through the waveguide element; and processing the first reflection light wave via the light module.

22. The detection method as claimed in claim 21, further comprising:

providing a second surface grating structure, wherein the second surface grating structure is disposed on the waveguide element;

generating a second incident light wave via the light module, wherein the second incident light wave is propagated through the waveguide element;

transmitting the second incident light wave toward the object via the second surface grating structure;

receiving a second reflection light wave from the object via the second surface grating structure, wherein the second reflection light wave is propagated through the waveguide element; and processing the second reflection light wave via the light module.

23. The detection method as claimed in claim 15, further comprising:

providing a projection module, wherein the projection module is coupled to the waveguide element; and generating a projection light wave via the projection module, wherein the projection light wave is propagated through the waveguide element.

* * * * *